(12) United States Patent
Lafon et al.

(10) Patent No.: US 8,605,217 B1
(45) Date of Patent: Dec. 10, 2013

(54) JITTER CANCELLATION FOR AUDIO/VIDEO SYNCHRONIZATION IN A NON-REAL TIME OPERATING SYSTEM

(71) Applicant: Texas Instruments Incorporated, Dallas, TX (US)

(72) Inventors: Philippe Lafon, Cagnes sur Mer (FR); Frederic Turgis, Mougins (FR); Nicole Chalhoub, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/676,799

(22) Filed: Nov. 14, 2012

(30) Foreign Application Priority Data

Oct. 30, 2012 (EP) ..................................... 12290375

(51) Int. Cl.
*H04N 7/00* (2011.01)
*H04N 7/01* (2006.01)
(52) U.S. Cl.
USPC ............................ 348/497; 348/459; 348/441
(58) Field of Classification Search
USPC .......... 348/497, 441, 446, 459, 458; 386/233, 386/232

IPC ...................................... H04N 7/00,7/01, 11/20
See application file for complete search history.

(56) References Cited

U.S. PATENT DOCUMENTS

| 2005/0018075 | A1* | 1/2005 | Ketrenos | 348/441 |
| 2009/0052511 | A1* | 2/2009 | Wu | 375/226 |
| 2011/0096226 | A1* | 4/2011 | Garrido et al. | 348/441 |

\* cited by examiner

*Primary Examiner* — Sherrie Hsia
(74) *Attorney, Agent, or Firm* — Ronald O. Neerings; W. James Brady; Frederick J. Telecky, Jr.

(57) ABSTRACT

Displaying a stream of video data on a display device may be performed by decoding a portion of the video data to form a video frame. A queue time is determined when the video frame should be displayed. The queue time is adjusted by a margin time relative to a next display time to compensate for interrupt jitter, wherein the margin time is less than a period of time between periodic display time events and is larger than a specified interrupt jitter time. A software interrupt event is set to occur corresponding to the adjusted queue time. The video frame is queued in response to occurrence of the software interrupt. The queued video frame is transferred to a display buffer for the display device upon the occurrence of a next display time event after the occurrence of the software interrupt.

20 Claims, 4 Drawing Sheets

JITTER CANCELLATION FOR AUDIO/VIDEO SYNCHRONIZATION IN A NON-REAL TIME OPERATING SYSTEM

CLAIM OF PRIORITY UNDER 35 U.S.C. 119(a)

The present application claims priority to and incorporates by reference European Patent Application number EP-12290375.0, filed Oct. 30, 2012, entitled "Jitter Cancellation for Audio/Video Synchronization in a Non-Real Time Operating System."

FIELD OF THE INVENTION

This invention generally relates to synchronization and display of video frames, and in particular to the use of a non-real time operating system to perform the synchronization.

BACKGROUND OF THE INVENTION

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Once a compressed video sequence is decompressed, it may be displayed on a screen for viewing by a person. Many display devices support multiple frame rates for video images. Current devices may support display rates of up to 60 frames per second (fps), for example. Typically, a video sequence derived from a movie film provides 24 fps. A video sequence derived from a television source may provide 30 fps. Other video sources may provide additional different frame rates.

BRIEF DESCRIPTION OF THE DRAWINGS

Particular embodiments in accordance with the invention will now be described, by way of example only, and with reference to the accompanying drawings.

Figure 1:
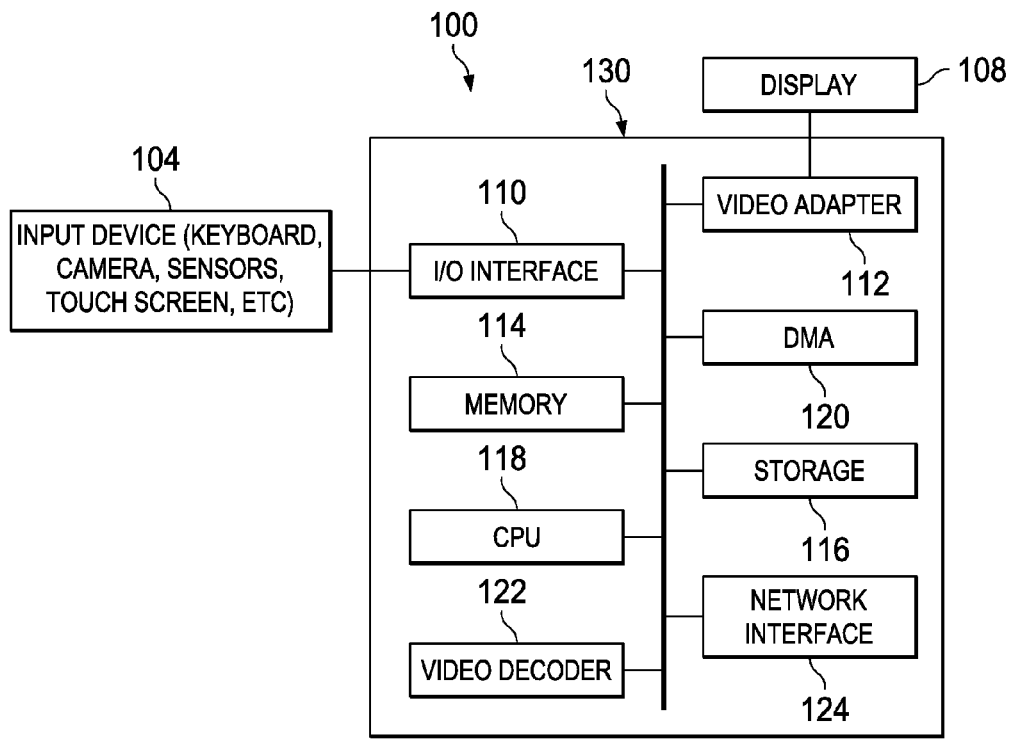
FIG. 1 is a block diagram of an example system that embodies the invention.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Digital video players are now being implemented on platforms, such as mobile handsets, running a non-realtime operating system (OS) such as LINUX. Good video playback quality requires frames be played with a regular temporal distance. Typically, a hardware based control module is used to synchronize video playback. However, if a synchronization task running under control of LINUX, or another non-realtime OS, is used to determine when a next video frame is to be displayed, then the time when each picture frame of a video sequence is actually displayed may be subject to some jitter. A video presentation with temporal jitter can be extremely annoying, especially on video sequences that contain large regular motions.

Embodiments of this invention provide a way to use synchronization task running under control of LINUX, or other non-realtime OS, without inducing temporal jitter and thus allow an optimal display quality without the expense of a hardware based synchronization module.

The display time of each picture may be determined by an AV sync (audio/video synchronization) algorithm running as a task under control of the OS. This display time is used for passing the video frame to a display unit, but the actual picture transfer/display is triggered by an event coming from the display unit: The display unit produces ticks, such as for 60 Hz refresh, which are potential occurrences for the picture transfer/display events.

There are two main asynchronous activities. The first is passing the frame to the display unit and may be performed at a time determined by an OS event and is thus inaccurate due to jitter of event interrupts in a non-realtime OS. The second activity is the actual picture transfer/display event that is regular and accurate since it is triggered by the display unit ticks.

When both events are close in time the problem may appear since the jitter may cause the video frame to be passed to display unit after the intended display unit tick. In this case, the video frame data will be actually transferred at a next tick. This would result in some video frames being displayed too late while others may be displayed too early. As will be described in more detail below, embodiment of the invention determine in advance when the actual display tick will occur compared to the computed AV sync display time. Then, each synchronized event time that is used to trigger the transfer of a next video frame of data is modified so that it occurs with adequate margin prior to the display tick to overcome event time jitter induced by the non-realtime OS Another solution may to be to put a video frame scheduler in the display unit where the display time of pending video frames is checked directly for each occurrence of a display tick by monitoring a queue of pending picture frames. However, this solution may require that each tick be processed by the CPU running the OS even if no image is actually to be transferred. In order to process the pending queue in each display tick may require waking the CPU from a low power state which results in more power being dissipated by the system. Power dissipation is an important factor in battery powered mobile systems.

Embodiments of the invention provide a synchronization method that is generic and allows proper functionality even when the display unit frequency differs from the video frame rate. It does not require that the system CPU wake up at each possible display tick. This method uses a common time programmed wake up event, such as is offered by the Android Multimedia Framework, and thus allows the CPU to potentially sleep until the modified display time is reached for queuing the next frame to be displayed.

FIG. 1 is a block diagram of an example computer system 100 in accordance with one or more embodiments of the invention. The computer system 100 may part of smart phone or other mobile device such as a tablet, video player, etc., for example. Computer system 100 includes a processing unit 130 equipped with one or more input devices 104, such as a keyboard, camera, motion and attitude sensors, or the like, and one or more output devices, such as a display 108, or the like. In some embodiments of the invention, the display 108 may be touch screen, thus allowing the display 108 to also function as an input device. The processing unit 130 may be, for example, a system on a chip (SoC), a dedicated unit customized for a particular application, a desktop computer, a workstation, a laptop computer, or the like. The display may be any suitable visual display unit such as, for example, a computer monitor, an LED, LCD, or plasma display, a television, a high definition television, or a combination thereof.

The processing unit 130 includes a central processing unit (CPU) 118, memory 114, a storage device 116, a video adapter 112, direct memory access (DMA) 120, an I/O interface 110, a video decoder 122, and a network interface 124 connected to a bus. The bus may be one or more of any type of several bus architectures including a memory bus or memory controller, a peripheral bus, video bus, or the like.

The CPU 118 may be any type of electronic data processor. For example, the CPU 118 may be a processor from Intel Corp., a processor from Advanced Micro Devices, Inc., a Reduced Instruction Set Computer (RISC), an Application-Specific Integrated Circuit (ASIC), or the like. The memory 114 may be any type of system memory such as static random access memory (SRAM), dynamic random access memory (DRAM), synchronous DRAM (SDRAM), read-only memory (ROM), flash memory, a combination thereof, or the like. Further, the memory 114 may include ROM for use at boot-up, and DRAM for data storage for use while executing programs.

The storage device 116 (e.g., a computer readable medium) may comprise any type of storage device configured to store data, programs, and other information and to make the data, programs, and other information accessible via the bus. In one or more embodiments of the invention, the storage device 116 stores software instructions that, when executed by the CPU 118, cause the processing unit 130 to perform video decoding and synchronization, as will be described in more detail below. The storage device 116 may be, for example, flash memory or other non-volatile memory, a flash drive, a magnetic disk drive, an optical disk drive, or the like. DMA 120 may be programmed to move decoded video frames to video adaptor 112 in response to display ticks provided by video adaptor 112 when scheduled to do so by the video synchronization task.

The software instructions may be initially stored in a computer-readable medium such as a compact disc (CD), a diskette, a tape, a file, memory, or any other computer readable storage device and loaded and executed by the CPU 118. In some cases, the software instructions may also be sold in a computer program product, which includes the computer-readable medium and packaging materials for the computer-readable medium. In some cases, the software instructions may be distributed to the computer system 100 via removable computer readable media (e.g., floppy disk, optical disk, flash memory, USB key), via a transmission path from computer readable media on another computer system (e.g., a server), etc.

The network interface 124 allows the processing unit 130 to communicate with remote units via a network (not shown). The network interface 124 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The computer system 100 may also include other components not specifically shown. For example, the computer system 100 may include power supplies, cables, a motherboard, removable storage media, cases, and the like.

Video decoder component 122 decodes frames in an encoded video sequence received from a digital video camera or other video source in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc. The decoded frames may be provided to the video adapter 112 for display on the display 108 using a software based synchronization process, as will be described in more detail below.

Figure 2:
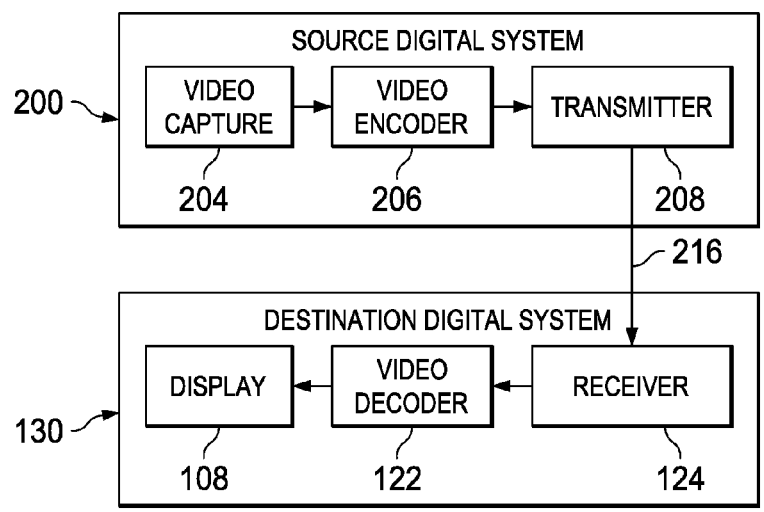
FIG. 2 is a block diagram illustrating the flow of video data in the system of FIG. 1.

FIG. 2 is a block diagram illustrating an example flow of video data in the system of FIG. 1. A source digital system 200 transmits encoded video sequences to a destination digital system 130 via a communication channel 216. Source digital system 200 may be a part of computer system 100, such as an on-board camera in a smart phone or tablet computer, for example. In other embodiments, source digital system 200 may be in a remote system that sends an encoded video sequence to computer system 130 via a wired or wireless communication channel 216, for example.

The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into coding units, and encodes the video data according to a selected encoding standard.

The transmitter component 208 transmits the encoded video data to the destination digital system 130 via the communication channel 216. The communication channel 216 may be any communication medium, or combination of communication media suitable for transmission of the encoded video sequence, such as, for example, wired or wireless communication media, a local area network, a wide area network, or a removable mass storage device, such as a flash drive, CD, etc.

The destination digital system 130 includes a receiver component 124, a video decoder component 122 and a display component 108. The receiver component 124 receives the encoded video data from the source digital system 200 via the communication channel 216 and provides the encoded video data to the video decoder component 122 for decoding. The video decoder component 612 reverses the encoding process performed by the video encoder component 606 to reconstruct the sequence of pictures of the video sequence.

The reconstructed video sequence is displayed on the display component 108. The display component 108 may be any suitable display device such as, for example, a plasma display, a liquid crystal display (LCD), a light emitting diode (LED) display, etc.

In some embodiments, destination digital system 130 may include a transmitter component and a video encoder component for transmission of video sequences both directions for video streaming, video broadcasting, and video telephony, for example.

Figure 3:
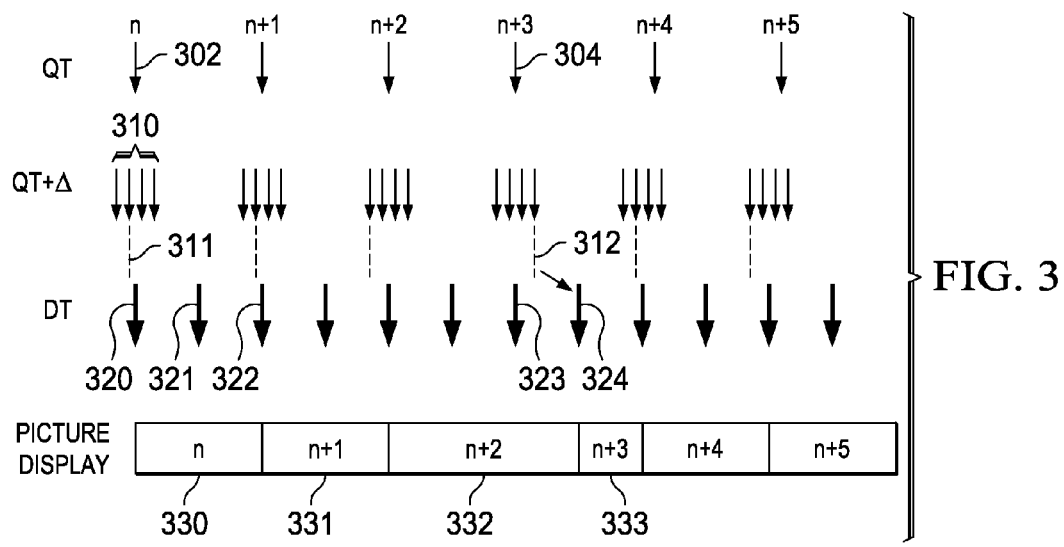
FIG. 3 is timing diagram illustrating how video jitter may occur in the system of FIG. 1.

FIG. 3 is timing diagram illustrating how video jitter may occur in system 100. Video sequences may show jitter during the playback. This jitter is very visible with sequences containing regular motion and is due to inaccurate timing when passing the picture to the display unit. With a 60 Fps (frame per second) display refresh and a video frame rate of 30 Fps, each picture should be displayed regularly with a 33.33 ms period: 33.33; 33.33; 33.33; 33.33; 33.33; 33.33; etc. With a 60 Fps display refresh and a video playing at 24 Fps each frame cannot be displayed with the same duration, however the display duration time pattern must be regular, such as: 33.33; 50.00; 33.33; 50.00; 33.33; 50.00; etc.

System 100 uses a software based synchronization process to manage displaying of each frame of the decoded sequence of video frames. As each video frame is decoded and stored in memory 114, for example, a time at which it should be displayed is determined, which is referred to as a queue time (QT). QT is determined based on the frame rate of the video sequence, as discussed above. A sequence of QTs is illustrated in FIG. 3, and a representative QT is indicated at 302 for a video sequence that contains 30 fps. After determining the QT for a decoded frame, which may be based on a time stamp, for example, a software interrupt event may be programmed to occur at the QT for the frame. The CPU that is executing program software in the system, such as CPU 118, may then go into a low power sleep mode if there are no other pending software applications to execute. This is typically done on battery powered mobile devices to conserve battery charge.

When the software interrupt event for QT 302, for example, is serviced, a video synchronization task is executed that places 311 the corresponding video frame in a queue to be transferred from memory 114 to video adaptor 112 by DMA 120. Video adaptor 112 generates display time (DT) tick 320 each time it is ready to refresh a frame buffer that holds the picture that is displayed by display device 108. In this example, display screen 108 is refreshed at 60 fps. Upon the occurrence of each DT tick, such as DT tick 320, DMA 120 transfers whatever video frame is currently indicated in the queue from memory 114 to video adaptor 112 and video frame 330 is displayed. The queue typically contains a pointer that points into a structure that contains pointers to the actual buffers, such as Y U V, that are located in memory 114, for example.

The DMA engine 120 is programmed by a driver that provides the next buffer to be displayed to a DMA control module. The DMA control module triggers each DMA transfer when a display vertical sync interrupt occurs, which corresponds to DT. Each DMA transfer refreshes display screen 108. The DMA transfers a video frame from buffers in memory 114 each time the display is refreshed, for example, 60 Fps. The same buffer may be displayed several times, until a new buffer pointer is loaded into the queue at the appropriate time. For example, at DT tick 321, the same video frame 330 is transferred again. At DT tick 322, next video frame 331 is transferred and displayed on display screen 108. In this example, a new frame should be transferred every two DT ticks, since the screen refresh rate is 60 Fps and the video rate is only 30 Fps.

Since the operating system is not constrained to operate in real time, there may be some delay in responding to the QT event interrupt, depending on what else the CPU is executing at the time, as indicated by jitter error 310. Jitter error typically ranges from −1 ms up to +11 ms, as determined by OS kernel, OS tick, audio clock noise calculation, etc. As long the synchronization task responds to the QT event interrupt quickly enough to update 311 the frame queue before DT tick 320, all is well. However, for example, if the synchronization task responds to QT event 304 and updates 312 the queue after the occurrence of DT tick 323 due to jitter error, then video frame 332 will be displayed for an additional refresh period until the next DT tick 324. Consequently, video frame 332 is displayed for three refresh periods and video frame 333 is only displayed for one refresh period. Thus, for this 30 Fps video, the display may refresh as follows: 33.33; 33.33; 33.33; 50.00; 16.66; 33.33; 33.33; 33.33 etc.

The faulty event appears randomly and can be annoying to a viewer. Its probability is high when the programmed QT event to display the picture is close to the display tick. In this case a small jitter may make the picture QT time miss the occurrence of its corresponding display transfer tick, therefore the picture will be delayed to the next tick (ex. 16.6 ms).

Figure 4:
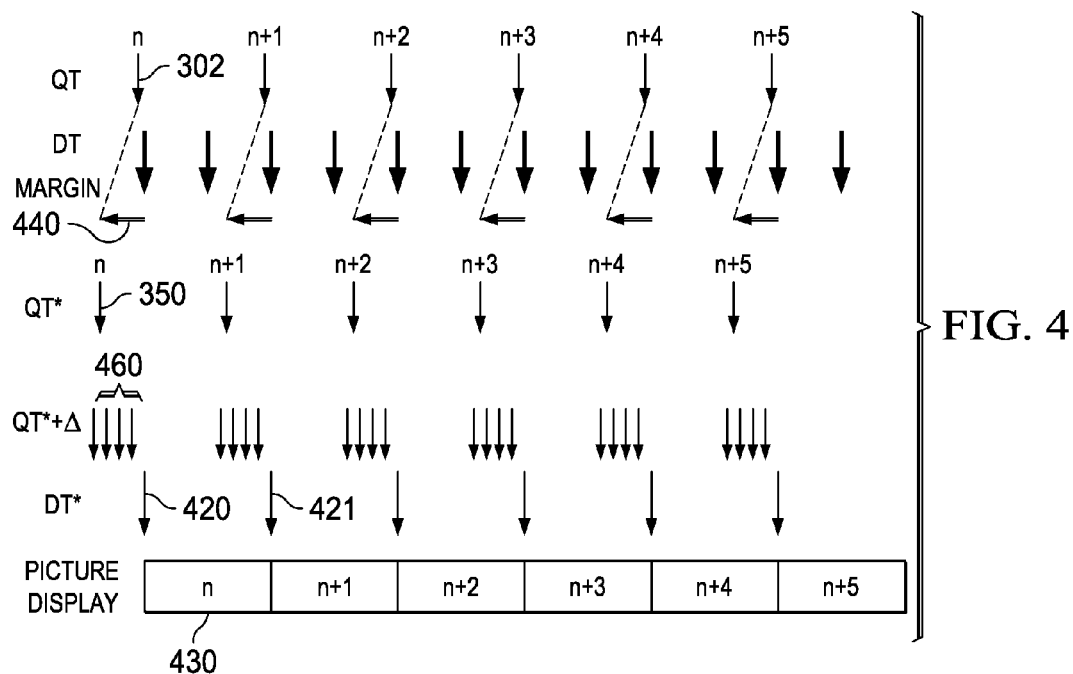
FIG. 4 is a timing diagram illustrating how video jitter may be prevented in the system of FIG. 1.

FIG. 4 is a timing diagram illustrating how video jitter may be prevented in system 100. Embodiments of the invention check and adapt each picture queuing time (QT) depending on the next display transfer tick occurrence time (DT). This is to provide enough margin so that the jitter error doesn't cross a DT boundary event.

As described above, a software based audio/visual synchronization (AV sync) task calculates in advance each QT 302, which is the time when a video frame should be queued for display. Then it predicts the time of the subsequent DT* time 420 that is supposed to trigger the picture transfer, and modifies QT to form: QT*=DT*−margin 440. The AV sync task then programs a software interrupt event to wake up at QT* 350 time, for example. At wake up time QT* 350+Jitter 460, the AV sync puts the buffer into the display queue. Upon display tick DT* 420, the DMA control module starts a DMA frame transfer for video frame 430 and records this DT time 420 to be used for the next DT tick 421 prediction, for example.

In this manner, a software synchronization task executed under a non-realtime operating system may be used to reliably perform audio and video synchronization to a video display device. The CPU that executes the AV sync task may be placed into a low power sleep mode between frames to conserve battery power. Dedicated hardware is not needed for synchronization, which makes it possible for processing unit 130 to be used with a wide variety of video streams having different frame rates and various types of display devices with different refresh rates without the need for expensive and power consuming synchronization hardware.

Figure 5:
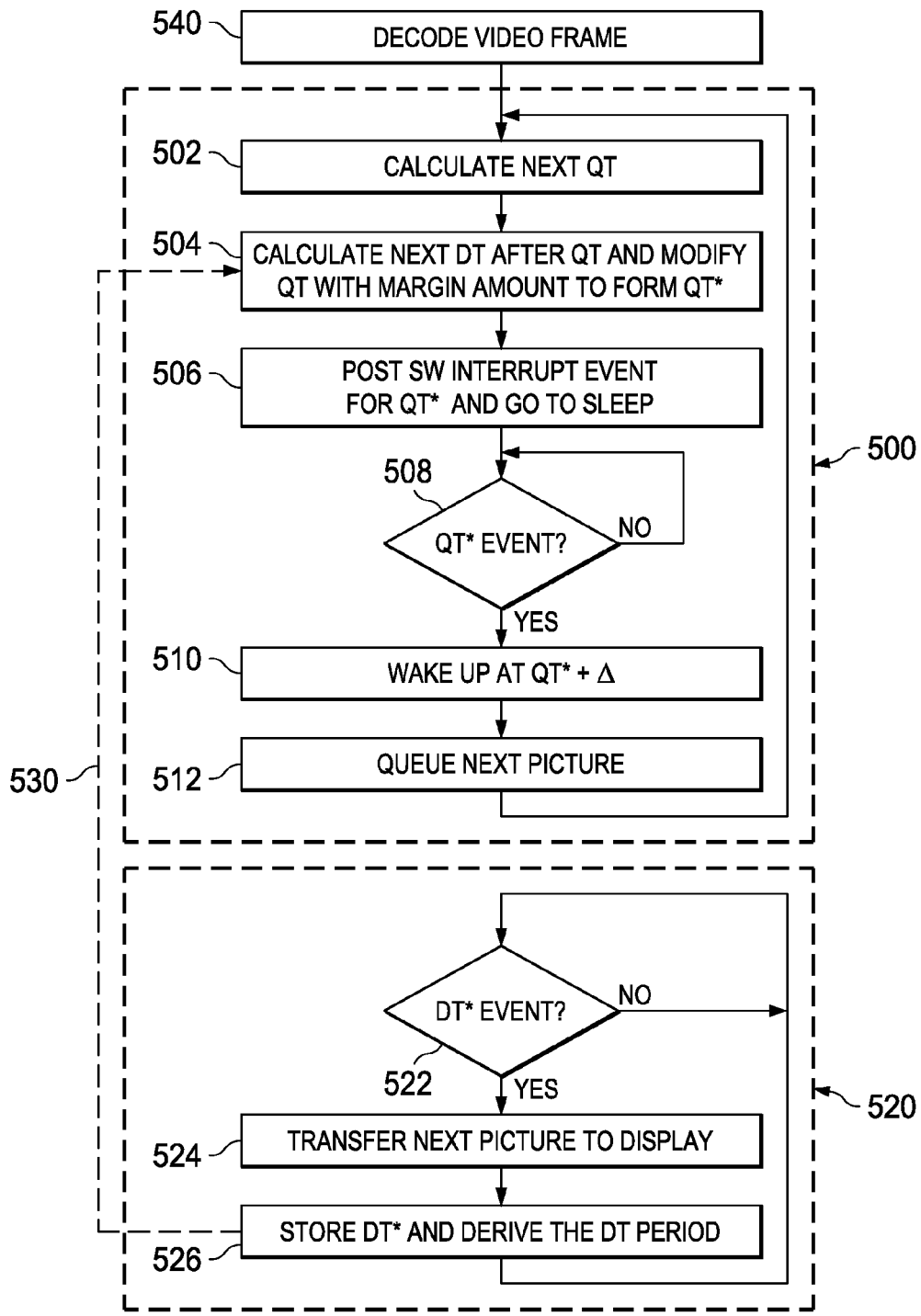
FIG. 5 is a flow chart illustrating prevention of video jitter.

FIG. 5 is a flow chart illustrating prevention of video jitter in a video display system such as system 100. Loop 500 may be executed by a synchronization task being executed under a non-realtime OS by CPU 118, for example. Loop 520 may be a hardware driven loop executed by video adaptor 112, for example. As such, both loops operate independently of each other. As described earlier, decoding of video frames 540 may be performed by other software executed by CPU 112, or may be performed by a hardware accelerator, for example.

As described above in more detail, with a 60 Fps display refresh and a video frame rate of 30 Fps, each picture should be displayed regularly with a 33.33 ms period: 33.33; 33.33; 33.33; 33.33; 33.33; 33.33; etc. With a 60 Fps display refresh and a video playing at 24 Fps each frame cannot be displayed with the same duration, however the display duration time pattern must be regular, such as: 33.33; 50.00; 33.33; 50.00; 33.33; 50.00; etc.

Loop 530 uses a software based synchronization process to manage displaying of each frame of the decoded sequence of video frames. As each video frame is decoded 540 and stored in memory, for example, a time at which it should be displayed is determined 502, which is referred to as a queue time (QT). QT is determined based on the frame rate of the video sequence, as discussed above. The next DT occurrence time is then calculated 504, using a DT* value stored 526 by a recent refresh cycle. QT is then modified 504 to form: QT*=DT*−margin, where a margin value is selected that is large enough to exceed an expected amount of interrupt latency that may occur due to the non-realtime nature of the OS. For example, the margin may be selected to be three fourths of the DT period, where the DT period is the inverse of the video device refresh rate. In another example, the margin may be selected to be one half the DT period.

A software interrupt event is then posted 506 to wake up at the QT* time. The CPU that is executing program software in the system, such as CPU 118, may then go into a low power sleep mode if there are no other pending software applications to execute. This is typically done on battery powered mobile devices to conserve battery charge.

Once the interrupt occurs 508, the sync process is resumed 510 at wake up time QT* plus some amount of jitter+Δ. The next video frame is then added 512 to the display queue. Since the amount of margin was selected to be greater than the amount of jitter, the video frame will be posted in the queue prior to the occurrence of the next DT tick. Typically, the queue contains pointers. Those pointers typically point onto a structure that contains pointers to the actual buffers (Y U V) and other types of information that are generated during the video decode process 540. Thus, at this point, the sync process is simply manipulating pointers.

Sync loop 530 continues in this manner for the length of the video sequence.

When display tick DT* occurs 522, a DMA control module, such as DMA 120 for example, may be programmed to start a DMA frame transfer 524 for the video frame that is currently in the queue. The current DT time may be recorded 526 for use in the next QT* calculation 504. The DMA engine may be programmed by a driver to provide the next buffer to be displayed to a hardware module. The DMA hardware may be programmed to perform a transfer each time the display vertical sync interrupt occurs (corresponding to DT). This transfer provides the refresh the display device. The video picture buffer is transferred each time the display device is refreshed, for example, 60 Fps. The same buffer may be displayed several refresh cycles, until a new buffer is provided at appropriate times.

System Example

Figure 6:
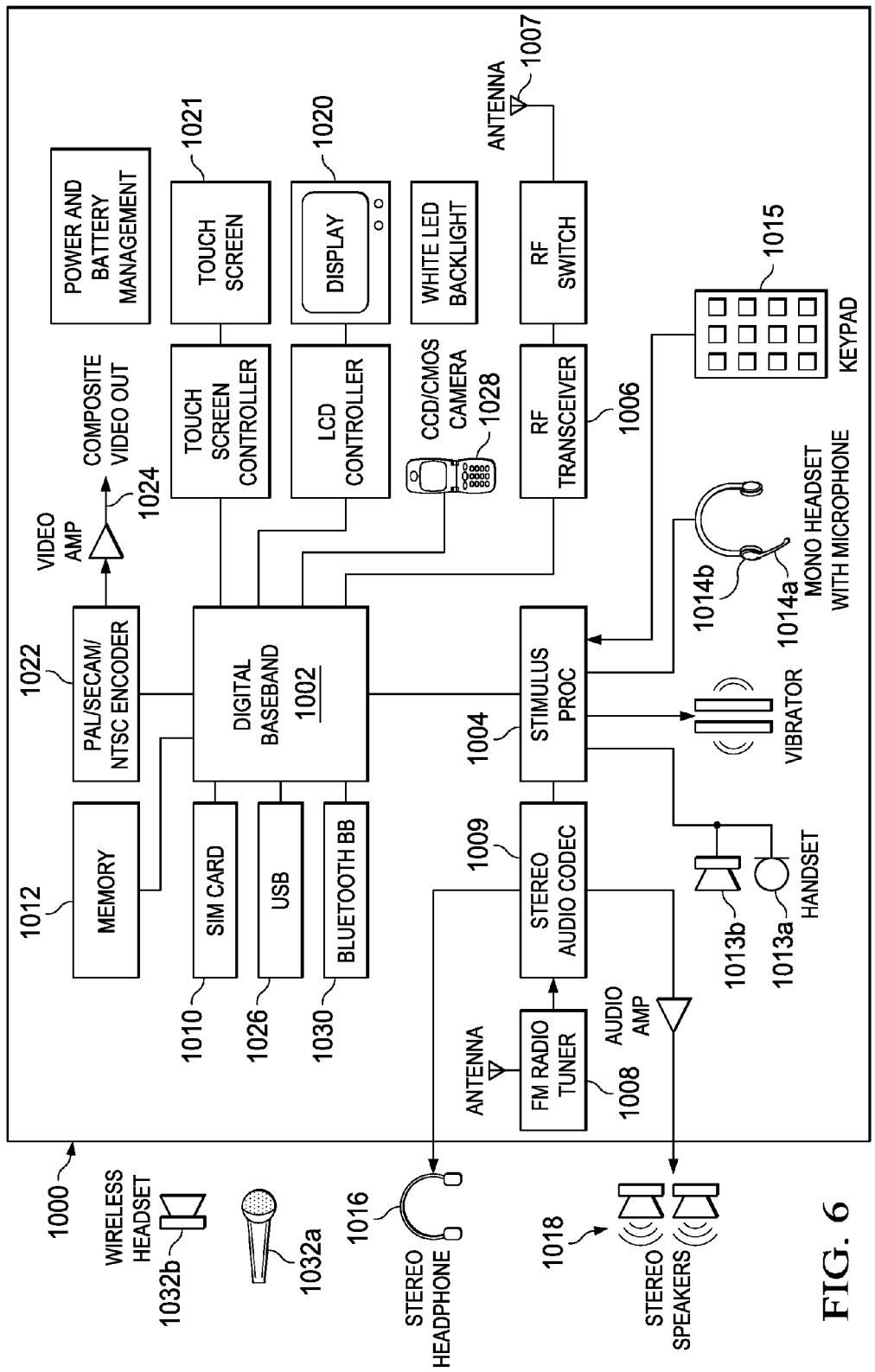
FIG. 6 is a block diagram of another example system that embodies the invention.

FIG. 6 is a block diagram of an exemplary mobile cellular phone 1000 that includes an embodiment of the present invention. Digital baseband (DBB) unit 1002 may include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

While decoding and displaying video sequences received from the network, the local camera, or from local memory, digital baseband unit 1002 uses a software based synchronization process as described herein in more detail to provide a jitter free video display on display 1020 or on a remote display using composite output signal 1024.

Other Embodiments

While the invention has been described with reference to illustrative embodiments, this description is not intended to be construed in a limiting sense. Various other embodiments of the invention will be apparent to persons skilled in the art upon reference to this description. For example, various embodiments of the invention are described herein may perform video decoding in accordance with the H.264 video coding standard. Other embodiments for other video coding standards will be understood by one of ordinary skill in the art. Accordingly, embodiments of the invention should not be considered limited to the H.264 video coding standard.

Embodiments of the synchronizer and methods described herein may be provided on any of several types of mobile devices, such as: smart phones, tablets, personal digital assistants, personal computers, etc.

Embodiments of the synchronizer and methods described herein may be provided on any of several types of stationary devices, such as: a personal computer, a digital video recorder (DVR), etc.

Embodiments of the synchronizer and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the video signal processing. Analog-to-digital converters and digital-to-analog converters provide coupling to the real world, modulators and demodulators (plus antennas for air interfaces) can provide coupling for waveform reception of video data being broadcast over the air by satellite, TV stations, cellular networks, etc or via wired networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for displaying a stream of video data on a display device, the method comprising:
    determining a queue time when a video frame of the stream of video data should be displayed;
    adjusting the queue time by a margin time relative to a next display time to compensate for interrupt jitter, wherein the margin time is less than a display time period of time between periodic display time events and is larger than an interrupt jitter time;
    setting an operating system interrupt to occur corresponding to the adjusted queue time; and
    queuing the video frame in response to occurrence of the operating system interrupt; such that the video frame is queued prior to the occurrence of the next display time.

2. The method of claim 1, further comprising transferring the queued video frame to a display buffer for the display device upon the occurrence of a next display time event after the occurrence of the operating system interrupt.

3. The method of claim 1, further comprising decoding a portion of the video data to form the video frame.

4. The method of claim 1, further comprising placing a processor that executes the operating system into a low power state after setting the operating system interrupt.

5. The method of claim 1, further comprising storing a time of occurrence of each display time event, and determining the next display time by adding display time period of time to a time of occurrence of the stored time of the prior display time event.

6. The method of claim 1, wherein the margin time has a value of between approximately one half and three fourths of the display time period of time.

7. The method of claim 1, wherein the operating system is a non-realtime operating system.

8. A system for displaying a video sequence, the system comprising:
    a processing unit (CPU) coupled to a memory, wherein the memory contains software instructions for an operating system and a video synchronization task;
    a video adaptor having an output for coupling to a video display device, wherein the video adapter is operable to generate periodic display time (DT) events separated by a DT period of time;
    a direct memory access (DMA) engine coupled to the memory and to the video adaptor;
    wherein the CPU is operable to execute instructions for the operating system and the synchronization task to perform a method comprising:
        determining a queue time (QT) when a first video frame of the video sequence should be transferred to the video adaptor;
        calculating an adjusted queue time (QT*) for the first video frame by adjusting the queue time by a margin time relative to a next DT event to compensate for interrupt jitter, wherein the margin time is less than the DT period of time and is larger than an interrupt jitter time;
        setting a software interrupt to occur corresponding to the adjusted queue time; and queuing the first video frame in response to an occurrence of the software interrupt, such that the first video frame is queued prior to the occurrence of the next DT event.

9. The system of claim 8, wherein the DMA engine is operable to transfer the queued first video frame to a display buffer for the display device upon the occurrence of the next DT event after the occurrence of the software interrupt.

10. The system of claim 8, further comprising a video decoding module operable to decode the first video frame from a sequence of video data.

11. The system of claim 8, wherein the time of occurrence of each DT event is stored, and a next display time is determined by adding the DT period of time to a time of occurrence of a last DT event.

12. The system of claim 8, wherein the margin time has a value of between approximately one half and three fourths of the DT period of time.

13. The system of claim 8, wherein the system is a mobile device, further comprising a display screen coupled to the output of the video adaptor.

14. A system for displaying a stream of video data on a display device, the system comprising:
 means for determining a queue time when a video frame of the stream of video data should be displayed;
 means for adjusting the queue time by a margin time relative to a next display time to compensate for interrupt jitter, wherein the margin time is less than a display time period of time between periodic display time events and is larger than an interrupt jitter time;
 means for setting an operating system interrupt to occur corresponding to the adjusted queue time; and
 means for queuing the video frame in response to occurrence of the operating system interrupt; such that the video frame is queued prior to the occurrence of the next display time.

15. The system of claim 14, further comprising means for transferring the queued video frame to a display buffer for the display device upon the occurrence of a next display time event after the occurrence of the operating system interrupt.

16. The system of claim 14, further comprising means for decoding a portion of the video data to form the video frame.

17. The system of claim 14, further comprising means for placing a processor that executes the operating system into a low power state after setting the operating system interrupt.

18. The system of claim 14, further comprising means for recording a time of occurrence of each display time event, and determining the next display time by adding display time period of time to a time of occurrence of a last display time event.

19. The system of claim 14, wherein the margin time has a value of between approximately one half and three fourths of the display time period of time.

20. The system of claim 14, wherein the operating system is a non-realtime operating system.

* * * * *